United States Patent [19]

Ikefuji

[11] Patent Number: 5,721,535
[45] Date of Patent: Feb. 24, 1998

[54] TAG RESPONSIVE TO HIGH FREQUENCY FOR VARYING CAPACITANCE OF CAPACITOR IN POWER SOURCE

[75] Inventor: Yoshihiro Ikefuji, Kyoto, Japan

[73] Assignee: Rohm Co., Ltd., Kyoto, Japan

[21] Appl. No.: 452,512

[22] Filed: May 30, 1995

[30] Foreign Application Priority Data

May 27, 1904 [JP] Japan .................. 6-114830

[51] Int. Cl.⁶ .............. H04G 5/22; G08B 13/14; G01S 13/74; H01L 27/108
[52] U.S. Cl. .............. 340/825.54; 340/571; 342/42; 257/312
[58] Field of Search ............. 340/825.54, 571, 340/562, 572; 342/51, 42; 361/281, 277, 299.4, 298.5; 257/312

[56] References Cited

U.S. PATENT DOCUMENTS 5,053,774  10/1991  Schuermann et al. .......... 342/44
5,287,113  2/1994  Meier ........................ 342/51
5,410,315  4/1995  Huber ........................ 342/42
5,499,017  3/1996  Beigel ....................... 340/572

*Primary Examiner*—Michael Horabik
*Assistant Examiner*—Anthony A. Asongwed
*Attorney, Agent, or Firm*—Fish & Richardson P.C.

[57] ABSTRACT

The outputted voltage of a rectifier 3 is detected by a voltage detector circuit 17. When the detected voltage value is low (received radio wave is weak, distance is long), a controller 20 turns off a switch 16 to connect only a capacitor 14 to the output of the rectifier 3, so that the capacitances of the capacitors are decreased and the build up of a power voltage is accelerated. On the other hand, when the detected voltage value is higher than a prescribed level (received radio wave is powerful, distance is short), the controller 20 turns on the switch 16 to connect capacitors 14, 15 in parallel with the output of the rectifier 3, so that the capacitances of the capacitors are increased and a ripple is fully removed. Thus, communications can be made while preventing a malfunction due to the ripple.

5 Claims, 4 Drawing Sheets

TAG RESPONSIVE TO HIGH FREQUENCY FOR VARYING CAPACITANCE OF CAPACITOR IN POWER SOURCE

BACKGROUND OF THE INVENTION a) Field of the Invention

This invention relates to a tag responsive to high frequency for effecting communications upon deriving electric power from a radio wave sent by an antenna.

b) Description of the Prior Art

A conventionally used tag responsive to high frequency (hereafter referred as RF-TAG) derives electrical power from a radio wave sent by an antenna and transmits information stored therein, and has been used for ski lift and railroad ticket gates.

This RF-TAG has a nonvolatile memory and a transmit/receive mechanism therein but not a power source such as a battery. It derives electrical power from the received radio wave (high frequency). Therefore, it is not required to have a battery therein and can exchange information over a long period of time. It is supplied with electrical power when needed, so that it has good energy efficiency even when it is not used frequently. Besides, it has an advantage that information is exchanged without making physical contact because a radio wave is used to exchange information.

The above RF-TAG needs a rectifier for a radio wave to be received because it derives a source voltage from the received radio wave, and has a capacitor for removing a ripple from the d.c. voltage derived in the rectifier.

When the ripple removing capacitor has a larger capacitance, the ripple in the source voltage can be decreased, but it takes a longer time to charge the capacitor. The time for obtaining a desired source voltage, or the rise time of the RE-TAG, is extended. The RF-TAG derives electrical power from the received radio wave when passing in front of a transmitter and carries out prescribed communications. When the source voltage cannot be derived in a short time, a communicative time is shortened, and the high-frequency tag cannot communicate unless it is close enough to the transmitter. Thus, there is a disadvantage that when the capacitor has a large capacitance, a communicative distance, or range, is shortened.

On the other hand, when the ripple removing capacitor has a small capacitance, there are disadvantages that the ripple in the source voltage is increased, and the operation of internal circuits is uncertain. Particularly, when the RF-TAG is very close to the transmitter, there are disadvantages that the ripple is very high, a voltage at the ripple bottom is below the minimum voltage, and the circuit operation is stopped.

This invention has been completed to remedy the above disadvantages and aims to provide an RF-TAG which can vary the capacitance of a ripple removing capacitor according to usage conditions, so that communications can always be appropriately carried out.

SUMMARY OF THE INVENTION

The RF-TAG according to this invention is provided with a tuning circuit which receives a high frequency wave having a tuning frequency, a power source which has a capacitor and rectifies output of the tuning circuit to output a source voltage, a voltage detector circuit which detects the source voltage outputted from the power source, and a capacitance varying means which varies a capacitance of the capacitor in the power source according to a detected value of the voltage detector circuit.

Thus, this invention can vary a capacitance of the ripple removing capacitor. When the source voltage is low (received radio wave is weak, distance is long), a capacitance of the capacitor is lowered to accelerate a build up of the source voltage. Accordingly, communications are completed in a prescribed time, and the range is extended. On the other hand, when the source voltage is above a prescribed level (received radio wave is powerful, distance is short), a capacitance of the capacitor is increased to fully remove the ripple. Thus, a malfunction due to the ripple can be prevented, enabling communications.

This invention also features that the power source in the RF-TAG has a plurality of capacitors, and the capacitance varying means changes the connected relationship of the plurality of capacitors of the power source to vary capacitances.

Thus, the capacitors' capacitance are adjusted by changing the connected relationship of the plurality of capacitors, e.g., a switch is turned on or off to connect or disconnect the capacitors. In this configuration, the capacitors' capacitances can be varied by a simple control.

This invention also relates to a system which derives electrical power from a high frequency wave from an antenna installed at a prescribed position, and exchanges prescribed information between the antenna and a plurality of RF-TAGS. These RF-TAGS are characterized to be the aforementioned RF-TAGS.

Thus, the information exchange system having a good efficiency of using a radio wave can be obtained by using the RF-TAGS.

DETAILED DESCRIPTION OF THE PREFERRED EMBODIMENT

Figure 1:
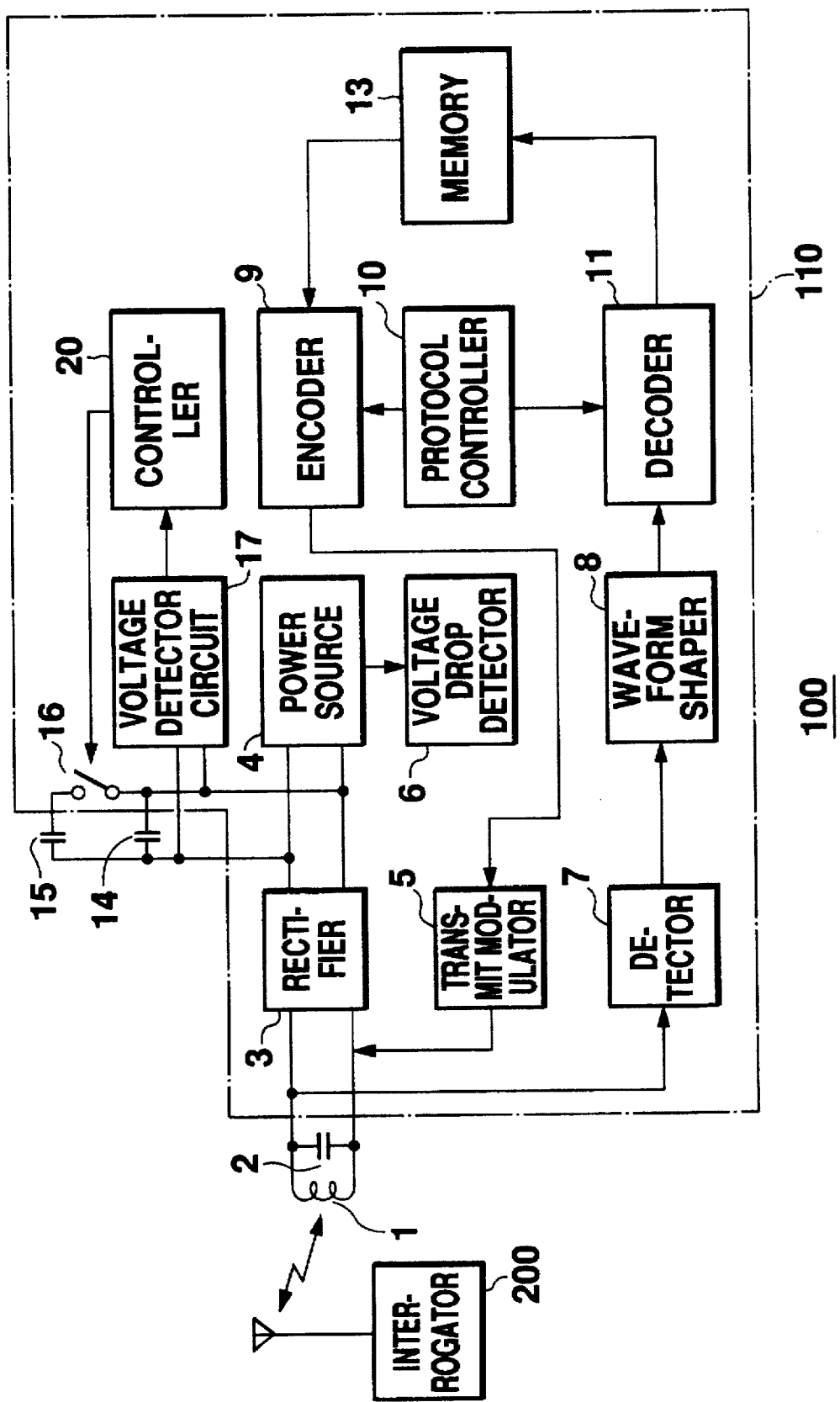
FIG. 1 is a block diagram showing an overall configuration of the embodiment.

The embodiment of the invention will be described with reference to the attached drawings. FIG. 1 is a block diagram showing an overall configuration of the embodiment, wherein an RF-TAG 100 exchanges a radio wave with an interrogator 200 having an antenna. The RF-TAG 100 is entirely molded with a resin and has a built-in integrated circuit (IC) 110 which carries out the mainly operations. A tuning coil 1 which works as a transmit/receive antenna has both ends connected to a tuning capacitor 2. A signal having a tuning frequency which is determined by the tuning coil 1 and the tuning capacitor 2 is outputted from both ends of the tuning coil 1. A rectifier 3 is connected to the tuning coil 1 to rectify the tuning coil output. The rectified output of the rectifier 3 is connected to a power source 4. The power source 4 supplies the RF-TAG 100 with electrical power for operating each circuit, and outputs a d.c. voltage supplied from the rectifier 3 as a prescribed constant voltage. A voltage drop detector 6 detects an output voltage drop of the power source 4 and stops operation when the source voltage drops to a level which cannot ensure the operation of each circuit.

A detector 7 is connected to the tuning coil 1 to detect and pick up a signal having a prescribed frequency tracked by the tuning coil 1. A waveform shaper 8 is connected to the detector 7 to shape the waveform of the detected output. Namely, data to be processed by the RF-TAG 100 is basic digital data, which is shaped into a rectangular pulse signal by the waveform shaper 8.

A decoder 11 is connected to the waveform shaper 8 to decode a supplied pulse according to a prescribed protocol to obtain desired digital data. Generally, a serial-to-parallel conversion is performed at this point. A memory 13 is connected to the decoder 11, and accessed by the output from the decoder 11. Namely, an address in the memory is outputted from the decoder 11, and data stored in the specified address is outputted from the memory 13.

Data read from the memory 13 is encoded by an encoder 9 according to a prescribed communication protocol. Generally, the encoder 9 also performs a parallel-to-serial conversion. A transmit modulator 5 is connected to the encoder 9 to superimpose the encoded data on a carrier wave having a tuning frequency, thereby modulating the data. The tuning coil 1 is connected to the transmit modulator 5 to transmit a signal from the transmit modulator 5. The transmit radio wave is received by the interrogator 200.

A protocol controller 10 controls the operations of the encoder 9 and the decoder 11.

The interrogator 200 superimposes a signal on a carrier wave having a prescribed tuning frequency to interrogate. When the RF-TAG 100 is close enough to the interrogator 200, the RF-TAG 100 uses a radio wave from the interrogator 200 as the power source 4, which outputs prescribed electrical power, and each circuit in the tag 100 starts to operate. Then, contents corresponding to interrogations from the interrogator 200 are lead from the memory 13 and transmitted to the interrogator 200.

Figure 2:
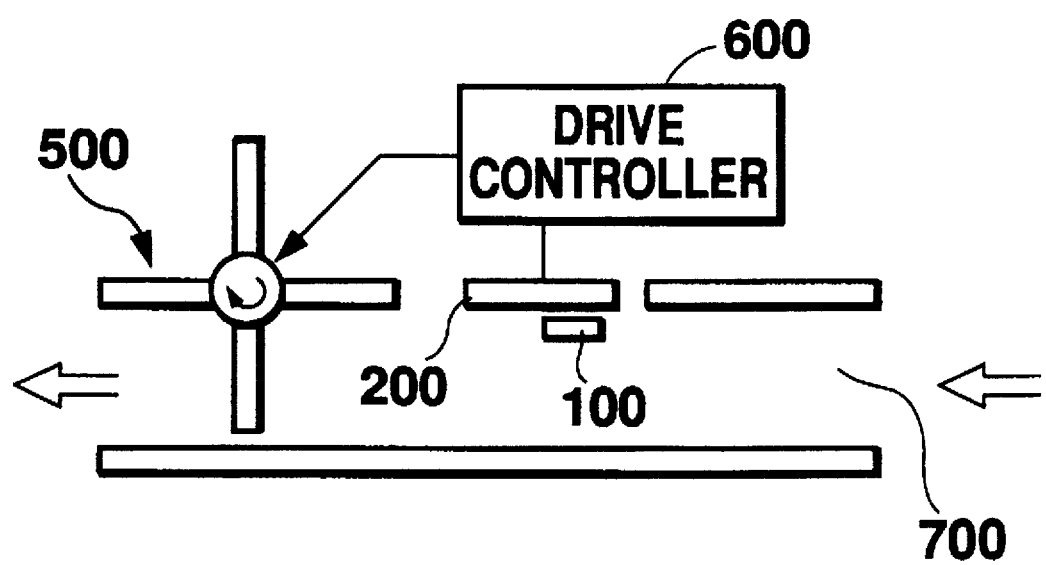
FIG. 2 is a diagram showing an overall configuration of the system.

FIG. 2 shows one example of the system consisting of the RF-TAG 100 and the interrogator 200. This example disposes the interrogator 200 on an edge of a path 700 to control the closing and opening of a gate 500, and is used for a ski lift gate for example. The interrogator 200 disposed on the edge superimposes a signal on a carrier wave having a prescribed tuning frequency to interrogate. When the RF-TAG 100 attached to an arm of a skier is close enough to the interrogator 200, the RF-TAG 100 uses a radio wave from the interrogator 200 as a power source, and power source 4 outputs prescribed electrical power, and each circuit in the tag 100 starts to operate. Then, contents corresponding to interrogations from the interrogator 200 are read from the memory 13 and transmitted to the interrogator 200. For example, data including a lift ticket type and expiration date are send back to the interrogator 200 at the ski lift gate. The interrogator 200 sends the received response to a drive controller 600, which then controls the opening and closing of a revolving gate 500. In this example, when communications are made by an appropriate RF-TAG 100, the revolving gate 500 has its lock released to allow a skier to pass through.

The RF-TAG 100 of this embodiment has two capacitors 14 and 15 which are connected in parallel to each other as ripple removing capacitors for removing the ripple from the output of the rectifier 3. A switch 16 is provided between the capacitors 14 and 15. When the switch 16 is turned on, both the capacitors 14, 15 are connected to the output of the rectifier 3, and when the switch 16 is turned off, only the capacitor 14 is connected to the output of the rectifier 3.

Assuming that the capacitance of the capacitor 14 is C1 and that of the capacitor 15 is C2, the capacitances of the ripple removing capacitors are C1+C2 when the switch 16 is turned on, and the capacitance of the ripple removing capacitor is C1 when the switch 16 is turned off.

A voltage detector circuit 17 is connected to the output of the rectifier 3 to detect a voltage of the output of the rectifier 3, and a controller 20 is connected to the voltage detector circuit 17 to compare the voltage value detected by the voltage detector circuit 17 with a prescribed threshold. The switch 16 is turned on when the detected voltage value is above a prescribed value, and the switch 16 is turned off when the detected voltage value is less than the prescribed value.

Figure 3:
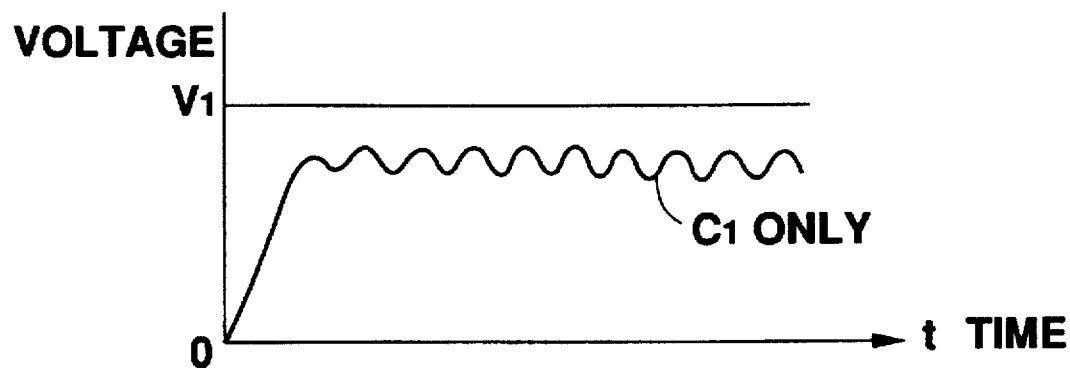
FIG. 3 is an explanatory view showing a state of the source voltage when an interrogator 200 is distant.

Assuming that the threshold in the controller 20 is V1, the output voltage of the rectifier 3 is low and the ripple is small as shown in FIG. 3 when the interrogator 200 is distant and the received radio wave is weak. In this case, the switch 16 is turned off to connect only the capacitor 14 to the output of the rectifier 3. Thus, the capacitance of the capacitors can be reduced, and a build up of the output voltage of the rectifier 3 can be accelerated. Communications can thus be made within a prescribed time. Since the ripple is small, there is no problem even when the ripple removing capacitor has a small capacitance.

Figure 4:
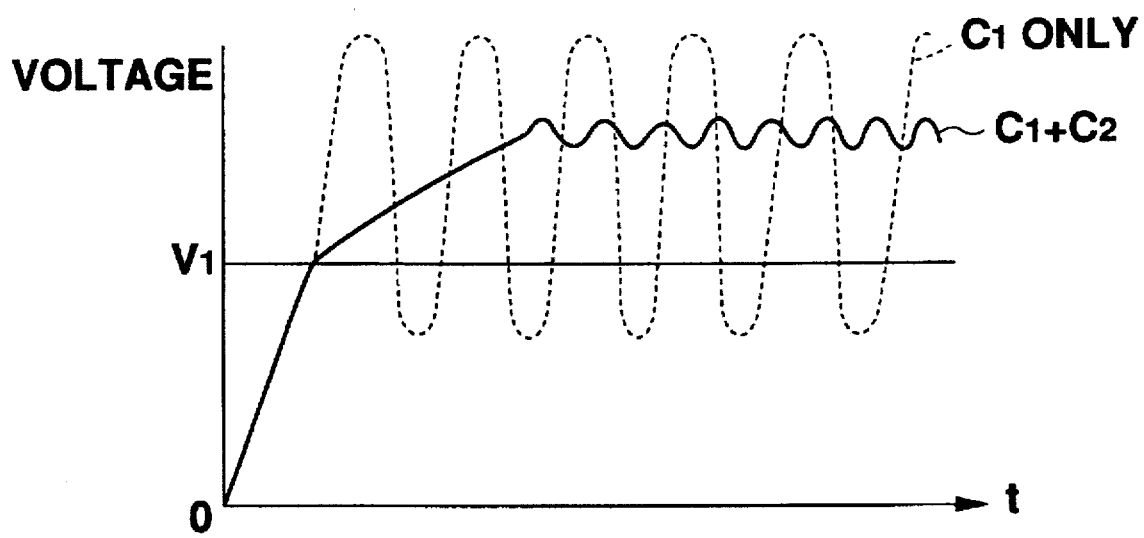
FIG. 4 is an explanatory view showing a state of the source voltage when an interrogator 200 is not distant.

On the other hand, when the interrogator 200 is not distant, the received radio wave is powerful and only the capacitor 14 is effective, the ripple is large as shown in FIG. 4.

Then, the switch 16 is turned on to effectively sum the capacitances C1 and C2 of the capacitors 14, 15 to remove the ripple. Thus, the ripple can be fully removed as shown in FIG. 3, making it possible to fully operate the device. Particularly, when the ripple is very large, the voltage drop detector 6 detects a drop of the source voltage, and the operation of the device may be disabled, completely disabling the communications. This disadvantage does not occur in the present embodiment.

The voltage detector circuit 17 detects the peak output of the rectifier 3, thereby being capable of detecting the receipt of a powerful radio wave in under a situation where that the capacitor 15 is disconnected. The voltage detector circuit 17 may detect the output of the power source 4 instead of the output of the rectifier 3. The ripple removing capacitors are not limited to the above two but may be three or more, or three or more capacitors may be connected via switches, and these switches can be turned on or off according to the voltage detected by the voltage detector circuit 17 to adjust the capacitances minutely. The switch 16 comprises an MOS transistor, which is suitably turned on or off according to the output from the controller 20. Besides, the ripple removing capacitors can be single, and may be a varicap if its capacitance can be adjusted.

Figure 5:
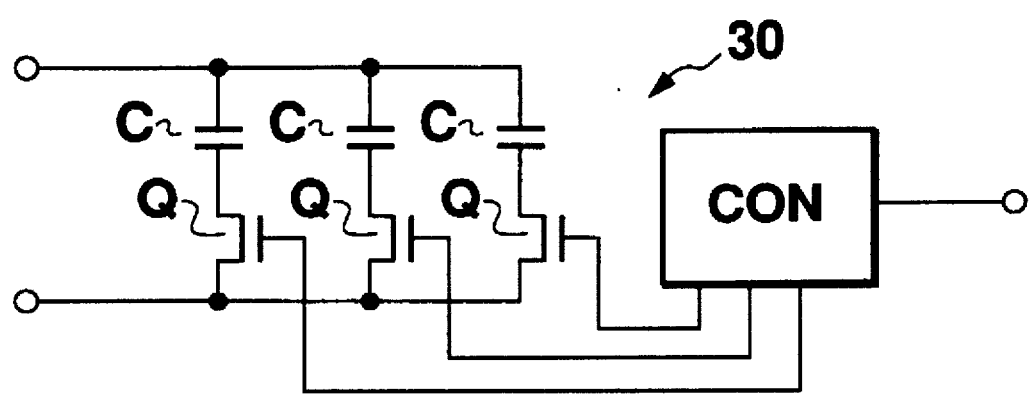
FIG. 5 is a diagram showing a configuration example of a variable capacitor.

FIG. 5 shows one example of the configuration of a variable capacitor 30, which can substitute for the capacitor 14, 15 and switch 16 in FIG. 1. In this example, three capacitors C are connected in series with three MOS switches Q, which are connected in parallel with each other. A controller CON controls to turn on/off the MOS switches. More specifically, when one of the three MOS switches Q is turned on the capacitance value of the variable capacitor 30 becomes C. When the three MOS switches Q are turned on, the capacitance value of the variable capacitor 30 becomes 3C. Accordingly, the capacitance value of the variable capacitor 30 can be controlled according to the signal from the controller 20. Setting the capacitances of the capacitors C to "1", "2" and "4", respectively allows setting of the capacitances to 0 to 7 according to the on/off control of the MOS switches Q. Also, the variable capacitor 30 may be a varicap if a capacitance can be varied. One end of the MOS switch Q may be extracted as a terminal to determine a value by an external capacitor. Another type of switch may be used instead of the MOS switch Q.

What is claimed is:

1. A tag responsive to high frequency for receiving a high frequency wave from an interrogator to derive electrical power from the high frequency wave and for communicating with the interrogator, comprising:

a tuning circuit that receives a high frequency wave having a tuning frequency;

a power source that includes rectifying capacitors and rectifies output of the tuning circuit to output a source voltage;

a voltage detector circuit that detects the source voltage output from the power source; and a capacitance varying circuit that varies the capacitance of the rectifying capacitors according to the source voltage detected by the voltage detector circuit.

2. A tag responsive to high frequency according to claim 1, wherein said power source includes a plurality of rectifying capacitors, and said capacitance varying circuit changes the connected relationship of the plurality of rectifying capacitors of said power source.

3. A tag responsive to high frequency according to claim 1, wherein at least one of the plurality of rectifying capacitors is directly connected to the output of a rectifier, and at least another one of the plurality of rectifying capacitors is connected to the output of the rectifier via a switch connected in series therewith, said switch being turned on or off by said capacitance varying circuit.

4. A system for exchanging prescribed information by providing a plurality of tags responsive to high frequency to derive electrical power from a high frequency wave from an interrogator disposed at a prescribed position and to communicate with said interrogator, wherein each of said plurality of tags responsive to the high frequency comprises:

a tuning circuit that receives a high frequency wave having a tuning frequency;

a power source that includes rectifying capacitors and rectifies output of the tuning circuit to output a source voltage;

a voltage detector circuit that detects the source voltage output from the power source; and a capacitance varying circuit that varies the capacitance of the rectifying capacitors according to the source voltage detected by the voltage detector circuit.

5. A system according to claim 4, wherein said power source includes a plurality of rectifying capacitors, and said capacitance varying circuit changes the connected relationship of the plurality of rectifying capacitors of said power source.

* * * * *